US010397302B2

(12) United States Patent
Chakra et al.

(10) Patent No.: US 10,397,302 B2
(45) Date of Patent: *Aug. 27, 2019

(54) LOADING PEGGED PAGE OBJECTS BASED ON PREDEFINED PREFERENCES

(71) Applicant: International Business Machines Corporation, Armonk, NY (US)

(72) Inventors: Al Chakra, Apex, NC (US); John A. Feller, Cary, NC (US); Trudy L. Hewitt, Cary, NC (US); Francesco C. Schembari, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 174 days.

This patent is subject to a terminal disclaimer.

(21) Appl. No.: 15/220,817

(22) Filed: Jul. 27, 2016

(65) Prior Publication Data
US 2016/0337436 A1    Nov. 17, 2016

Related U.S. Application Data

(63) Continuation of application No. 14/159,703, filed on Jan. 21, 2014, now Pat. No. 9,456,021.

(51) Int. Cl.
*G06F 3/0488* (2013.01)
*G06F 3/0482* (2013.01)
(Continued)

(52) U.S. Cl.
CPC ............ *H04L 67/02* (2013.01); *G06F 3/0482* (2013.01); *G06F 3/0483* (2013.01);
(Continued)

(58) Field of Classification Search
CPC ............... G06F 3/04842; G06F 3/0483; G06F 17/30905; G06F 16/954; G06F 16/9577;
(Continued)

(56) References Cited

U.S. PATENT DOCUMENTS 6,219,818 B1    4/2001 Freivald et al.
6,243,761 B1 *  6/2001 Mogul .................... H04L 29/06
                                                         709/217

(Continued)

FOREIGN PATENT DOCUMENTS

WO    2012021780 A2    2/2012

OTHER PUBLICATIONS

Sparkchess, Aug. 26, 2011, http://www.sparkchess.com, 6.0.0 online lite (sparkchess.pdf), 6 pages.
(Continued)

*Primary Examiner* — Aaron Lowenberger
(74) *Attorney, Agent, or Firm* — Jordan IP Law, LLC

(57) ABSTRACT

Methods and systems may provide for receiving a set of attributes that identify a pegged area of a page delivered to a user interface during a first browsing session and storing the set of attributes. Additionally, the set of attributes may be used to conduct a subsequent delivery of the pegged area to a user interface during a second browsing session, wherein the subsequent delivery of the pegged area excludes portions of the page that are outside the pegged area. In one example, the subsequent delivery is conducted further based on the type of client device participating in the second browsing session.

12 Claims, 3 Drawing Sheets

(51) Int. Cl.

| | | |
|---|---|---|
| *G06F 3/0483* | (2013.01) | |
| *G06F 3/0484* | (2013.01) | |
| *H04W 4/18* | (2009.01) | |
| *H04L 29/08* | (2006.01) | |
| *G06F 16/954* | (2019.01) | |
| *G06F 16/957* | (2019.01) | |
| *H04L 12/26* | (2006.01) | |

(52) U.S. Cl.
CPC ........ *G06F 3/0488* (2013.01); *G06F 3/04842* (2013.01); *G06F 16/954* (2019.01); *G06F 16/9577* (2019.01); *H04L 43/0829* (2013.01); *H04L 67/306* (2013.01); *H04W 4/18* (2013.01)

(58) Field of Classification Search
CPC ..... G06F 3/0482; G06F 3/0488; H04L 67/02; H04L 43/0829; H04L 67/306; H04W 4/18
See application file for complete search history.

(56) References Cited

U.S. PATENT DOCUMENTS

| | | | |
|---|---|---|---|
| 6,366,933 B1 | 4/2002 | Ball et al. | |
| 6,553,419 B1 | 4/2003 | Ram | |
| 6,763,388 B1 | 7/2004 | Tsimelzon et al. | |
| 6,834,306 B1 | 12/2004 | Tsimelzon | |
| 6,981,225 B1 | 12/2005 | Gaudette | |
| 7,152,203 B2 | 12/2006 | Gao et al. | |
| 7,386,802 B2 | 6/2008 | Gaudette | |
| 7,523,158 B1 | 4/2009 | Nickerson et al. | |
| 7,559,016 B1 | 7/2009 | Rakowski et al. | |
| 7,702,811 B2 | 4/2010 | Gopalan et al. | |
| 7,958,232 B1 | 6/2011 | Colton et al. | |
| 8,103,742 B1 | 1/2012 | Green | |
| 8,176,433 B2 | 5/2012 | Bauchot et al. | |
| 8,181,112 B2 | 5/2012 | Jolley et al. | |
| 8,185,621 B2 | 5/2012 | Kasha | |
| 8,606,955 B1 | 12/2013 | Fernandes et al. | |
| 8,762,878 B1 | 6/2014 | Weber et al. | |
| 9,503,499 B1 * | 11/2016 | Donaldson ............... H04L 67/02 | |
| 2002/0154173 A1 | 10/2002 | Etgen et al. | |
| 2002/0194296 A1 | 12/2002 | Dutta et al. | |
| 2004/0044785 A1 | 3/2004 | Bell et al. | |
| 2006/0259585 A1 | 11/2006 | Keohane et al. | |
| 2006/0274083 A1 | 12/2006 | Makela | |
| 2007/0214239 A1 | 9/2007 | Mechkov et al. | |
| 2007/0288589 A1 | 12/2007 | Chen et al. | |
| 2008/0059544 A1 | 3/2008 | Rahim | |
| 2008/0104520 A1 | 5/2008 | Swenson et al. | |
| 2008/0200154 A1 | 8/2008 | Maharajh et al. | |
| 2008/0201452 A1 * | 8/2008 | Athas ............... H04L 29/12594 709/219 | |
| 2008/0307301 A1 * | 12/2008 | Decker ............. G06F 17/30905 715/241 | |
| 2009/0070413 A1 | 3/2009 | Priyadarshan et al. | |
| 2010/0005053 A1 | 1/2010 | Estes | |
| 2010/0007321 A1 | 1/2010 | Ogram | |
| 2010/0146400 A1 * | 6/2010 | Tesler ................. G06F 17/3089 715/745 | |
| 2010/0287462 A1 | 11/2010 | Hauser | |
| 2010/0313252 A1 | 12/2010 | Trouw | |
| 2010/0318892 A1 | 12/2010 | Teevan et al. | |
| 2011/0252160 A1 * | 10/2011 | Wu ....................... G06F 17/227 709/246 | |
| 2011/0261142 A1 * | 10/2011 | Shanmukhadas ........ H04N 7/15 348/14.1 | |
| 2011/0289392 A1 | 11/2011 | Naqvi | |
| 2012/0220346 A1 | 8/2012 | Yu et al. | |
| 2012/0278697 A1 | 11/2012 | Yokoyama et al. | |
| 2013/0138477 A1 | 5/2013 | Wilkins et al. | |
| 2013/0254652 A1 * | 9/2013 | Chinosornvatana .. G06F 17/211 715/234 | |
| 2013/0283150 A1 | 10/2013 | Chen et al. | |
| 2013/0332816 A1 | 12/2013 | Chakra et al. | |

OTHER PUBLICATIONS

TheDizle, Mar. 29, 2012, p. 6, http://gametipcenter.com/mass-effect-3-cheats-unlocks-unlockables-endings-guides-more, (Mass Effect 3.pdf), 21 pages.

Plainchess, https://github.com/timwoelfle/PlainChess/tree/99b4a5ad78d69691cb16197alac024e315cedf08 (Plainchess.pdf), pp. 1-2.

Al Chakra et al., "Displaying Quantitative Trending of Pegged Data from Cache", Specification and Drawings for U.S. Appl. No. 13/644,771, filed Oct. 4, 2012, 18 pages.

Non-Final Office Action for U.S. Appl. No. 14/159,703, dated Nov. 23, 2015, 26 pages.

Final Office Action for U.S. Appl. No. 14/159,703, dated Mar. 15, 2016, 26 pages.

Notice of Allowance for U.S. Appl. No. 14/159,703, dated Jun. 9, 2016, 11 pages.

Corrected Notice of Allowability for U.S. Appl. No. 14/159,703, dated Jun. 21, 2016, 6 pages.

Non-Final Office Action for U.S. Appl. No. 13/644,771, dated May 15, 2014, 22 pages.

Final Office Action for U.S. Appl. No. 13/644,771, dated Oct. 2, 2014, 29 pages.

Advisory Action for U.S. Appl. No. 13/644,771, dated Jan. 8, 2015, 4 pages.

Notice of Allowance for U.S. Appl. No. 13/644,771, dated Jan. 6, 2016, 16 pages.

Non-Final Office Action for U.S. Appl. No. 13/492,133, dated Dec. 2, 2014, 22 pages.

Final Office Action for U.S. Appl. No. 13/492,133, dated Mar. 26, 2015, 31 pages.

Advisory Action for U.S. Appl. No. 13/492,133, dated Jun. 18, 2015, 5 pages.

Non-Final Office Action for U.S. Appl. No. 13/492,133, dated Oct. 21, 2015, 14 pages.

Final Office Action for U.S. Appl. No. 13/492,133, dated May 9, 2016, 18 pages.

Notice of Allowance for U.S. Appl. No. 13/492,133, dated Sep. 23, 2016, 11 pages.

* cited by examiner

US 10,397,302 B2

LOADING PEGGED PAGE OBJECTS BASED ON PREDEFINED PREFERENCES

CROSS-REFERENCE TO RELATED APPLICATIONS

The present application is a continuation of U.S. patent application Ser. No. 14/159,703 filed on Jan. 21, 2014.

BACKGROUND

Embodiments of the present invention generally relate to the presentation of digital content to users. More particularly, embodiments relate to loading and displaying pegged page objects based on predefined preferences.

Web pages may be accessible via different types of devices such as desktop computers, tablet computers, smart phones, and so forth. If a user is only interested in a subset of the content on a particular web page, the user may be forced to wait until the entire page is loaded before interacting with the content of interest. Such an approach may have a negative impact on the user experience if network connectivity is relatively poor and/or a handheld device with a relatively small screen is being used to access the page.

BRIEF SUMMARY

Embodiments may include a computer program product having a computer readable storage medium and computer usable code stored on the computer readable storage medium. If executed by a processor, the computer usable code may cause a computer to receive a set of attributes that identify a pegged area of a page delivered to a user interface during a first browsing session and store the set of attributes. Additionally, the computer usable code, if executed, may cause a computer to use the set of attributes to conduct a subsequent delivery of the pegged area to a user interface during a second browsing session, wherein the subsequent delivery of the pegged area is to exclude portions of the page that are outside the pegged area.

Embodiments may also include a computer implemented method that provides for receiving a set of attributes that identify a pegged area of a page delivered to a user interface during a first browsing session and storing the set of attributes to a profile of a user associated with a client device participating in the first browsing session. The method may also involve using the set of attributes to conduct a subsequent delivery of the pegged area to a user interface during a second browsing session, wherein the subsequent delivery of the pegged area is conducted based on a type of client device participating in the second browsing session and a network connectivity of the client device participating in the second browsing session. In addition, the subsequent delivery of the pegged area may exclude portions of the page that are outside the pegged area if the type of client device participating in the second browsing session is a handheld device. The method may also provide for generating a prompt for delivery of the page in its entirety during the second browsing session.

Embodiments may also include a computer program product having a computer readable storage medium and computer usable code stored on the computer readable storage medium. If executed by a processor, the computer usable code may cause a computer to receive a set of attributes that identify a pegged area of a page delivered to a user interface during a first browsing session and store the set of attributes to a profile of a user associated with a client device participating in the first browsing session. The computer usable code, if executed, may also cause a computer to use the set of attributes to conduct a subsequent delivery of the pegged area to a user interface during a second browsing session, wherein the subsequent delivery of the pegged area is to be conducted based on a type of client device participating in the second browsing session and a network connectivity of the client device participating in the second browsing session. Additionally, the subsequent delivery of the pegged area may exclude portions of the page that are outside the pegged area if the type of client device participating in the second browsing session is a handheld device. The computer usable code, if executed, may also cause a computer to generate a prompt for delivery of the page in its entirety during the second browsing session.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
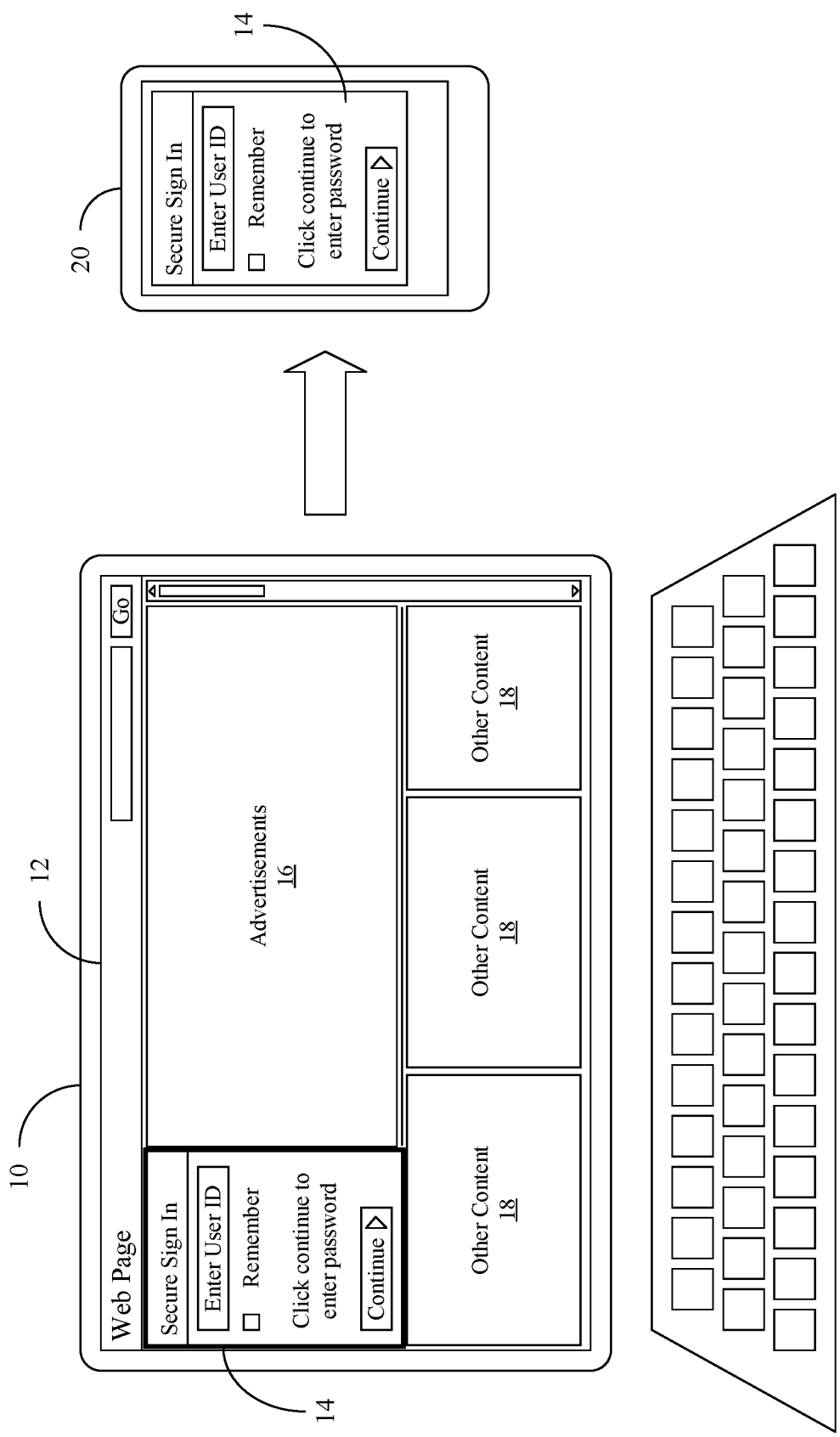
FIG. 1 is an illustration of an example of multiple client devices displaying a pegged area according to an embodiment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Referring now to FIG. 1, a desktop computer 10 is shown, wherein the illustrated desktop computer 10 has a relatively large user interface (UI, e.g., liquid crystal display/LCD, light emitting diode/LED display, monitor, etc.) that visually presents (e.g., displays) a web page 12 to a user (not shown) of the desktop computer 10 during a browsing session (e.g., first browsing session). The web page 12 may generally contain visual and/or audible content, wherein some portions of the content may be of more interest to the user than other portions. For example, a login portion 14 of the page 12 may be of relatively high interest to the user, whereas an advertisement portion 16 and/or other portions 18 of the page 12 may be of relatively low interest to the user.

In such a case, the user may designate the login portion 14 as a "pegged area" by conducting an action such as a cursor hover action, a touch screen action, and so forth, relative to the login portion 14. A set of attributes (e.g., screen coordinates, area height, area width, etc.) may be automatically identified in response to the action, wherein the attributes and/or objects within the pegged area may be identified based on, for example, a document object model (DOM) associated with the displayed content and/or metadata specifically associated with the pegged area. Of particular note is that the pegged area is selected by the user rather than the provider of the displayed content, in the illustrated example. As a result, the pegged area may be highly personalized on an individual-by-individual basis.

As will be discussed in greater detail, the attributes of the pegged area may be stored (e.g., to a user profile and/or preference) for future visits to the web page 12 by the user, wherein storage of the pegged area attributes may significantly enhance the user experience. For example, if the user later (e.g., in a subsequent browsing session) requests the web page 12 on the desktop computer 10, delivery of the web page 12 to the UI of the desktop computer 10 might be limited to the login portion 14 (i.e., the pegged area). Such an approach may enable the user to quickly interact with the portions of interest on the page 12 instead of waiting for the entire page 12 to be loaded. Indeed, the illustrated solution may be particularly advantageous when network connectivity is limited (e.g., poor and/or slow connection) for the desktop computer 10.

Moreover, if a mobile enabled version of the web page 12 is not available, viewing portions of interest on handheld devices may be difficult under conventional solutions. Thus, if the user later requests the web page 12 on another client device such as, for example, a handheld device 20 or other device having a relatively small form factor, delivering only the pegged area to the handheld device 20 as shown may eliminate a wasteful usage of network resources on content that is neither of interest to the user nor displayed on the UI of the handheld device 20.

Figure 2:
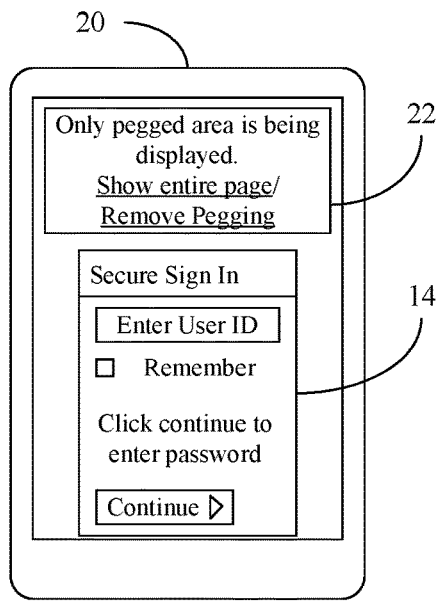
FIG. 2 is an illustration of an example of a handheld device displaying a pegged area and a prompt according to an embodiment.

FIG. 2 demonstrates that a prompt 22 for delivery of the page 12 (FIG. 1) in its entirety may be generated when only the pegged area is delivered to the UI of the client device.

In the illustrated example, the user is notified that only the pegged area of the page is being displayed and given the option of showing the entire page and/or removing pegging altogether (e.g., clearing pegged area attributes). As will be discussed in greater detail, an affirmative response to the options of the prompt 22 may result in the user being offered the opportunity to set a new pegged area on the page.

Figure 3:
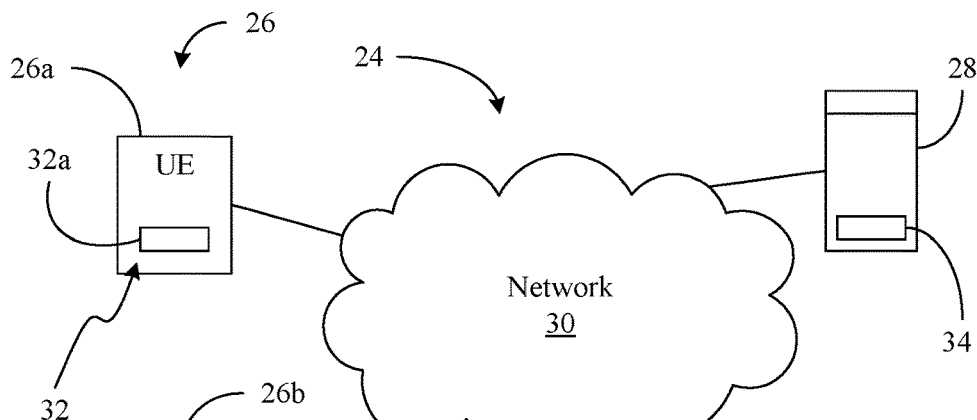
FIG. 3 is a block diagram of an example of a networking architecture according to an embodiment.

Turning now to FIG. 3, a networking architecture 24 is shown in which user equipment (UE) devices 26 (26a, 26b, e.g., client devices) are configured to initiate a retrieval of display content including one or more web pages from a server 28 via a network 30 during browsing sessions. The retrieved content may be visually presented (e.g., displayed) via user interfaces (UIs) 32 (32a, 32b, e.g., LCDs, LED displays, monitors) of the UE devices 26, as appropriate. In the illustrated example, the server 28 can have stored thereon hypertext markup language (HTML) and other markup language-encoded content, as well as databases and applications such as Java and other applications. The network 30 can itself include any suitable combination of servers, access points, routers, base stations, mobile switching centers, public switching telephone network (PSTN) components, etc., to facilitate communication between the UE devices 26 and the server 28. The UE devices 26 may also obtain display content locally from mass storage, flash memory, and so forth.

In one example, the server 28 includes computer usable code 34 (e.g., implemented on a computer readable storage medium) to receive a set of attributes that identify a pegged area of a page delivered to a user interface during a first browsing session. Thus, the first browsing session might be conducted on a first client device 26a, wherein the pegged area is identified on a page delivered to a first UI 32a of the first client device 26a during the first browsing session. The set of attributes may be obtained from a cookie stored on the first client device 26a and/or via a direct interaction with the user of the first client device 26a over the network 30. One example of such a direct interaction might include an authenticated session in which the user accesses a portal implemented on the server 28. The computer usable code 34 (e.g., when executed by an appropriate processor) may also store the set of attributes to a suitable non-volatile memory (NVM) location such as, for example, a database or other repository associated with the server 28. Storing the set of attributes might involve adding the attributes to a profile of the user associated with the client devices 26, generating one or more user preferences, and so forth.

Additionally, the computer usable code 34 may use the set of attributes to conduct a subsequent delivery of the pegged area to a user interface during a second browsing session, wherein the subsequent delivery of the pegged area may exclude portions such as, for example, the portions 16, 18 (FIG. 1) of the page that are outside the pegged area. Thus, the second browsing session might be conducted on a second client device 26b, wherein the subsequent delivery is to a second UI 32b of the second client device 26b during the second browsing session. In one example, the subsequent delivery of the pegged area is conducted based on the type of client participating in the second browsing session and/or a network connectivity of the client device participating in the second browsing session. The illustrated computer usable code 34 may therefore be particularly advantageous if, for example, the second client device 26b is a handheld device with a small form factor, the connectivity of the second client device 26b to the network 30 is poor and/or limited, and so forth, because only the pegged area is delivered to the second client device 26b rather than the page in its entirety.

Figure 4:
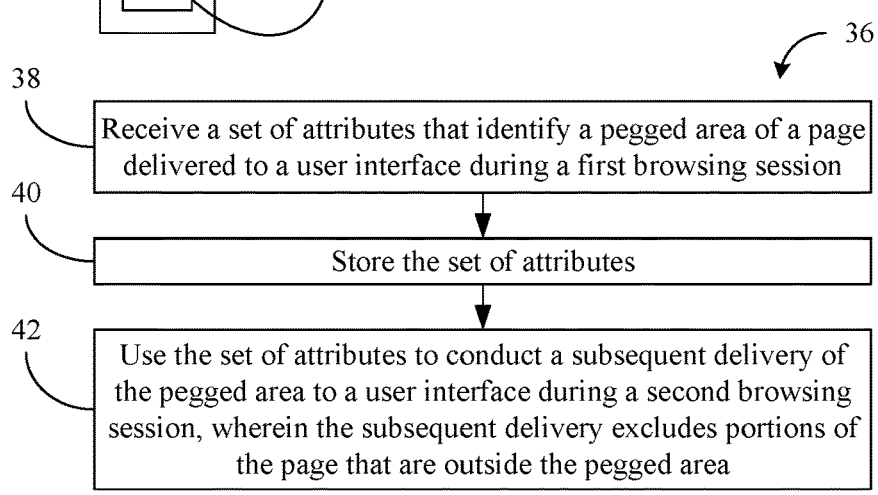
FIG. 4 is a flowchart of an example of a method of operating a server according to an embodiment.

FIG. 4 shows a method 36 of operating a server such as, for example, the server 28 (FIG. 3), already discussed. The method 36 may therefore be implemented in computer usable code such as, for example, the computer usable code 34 (FIG. 3) or other suitable hardware module, logic, circuit, etc. Illustrated processing block 38 provides for receiving a set of attributes that identify a pegged area of a page delivered to a UI during a first browsing session, wherein the set of attributes may be stored at block 40. In addition, the set of attributes may be used at block 42 to conduct a subsequent delivery of the pegged area to a UI during a second browsing session, wherein the subsequent delivery may exclude portions of the page that are outside the pegged area.

Figure 5:
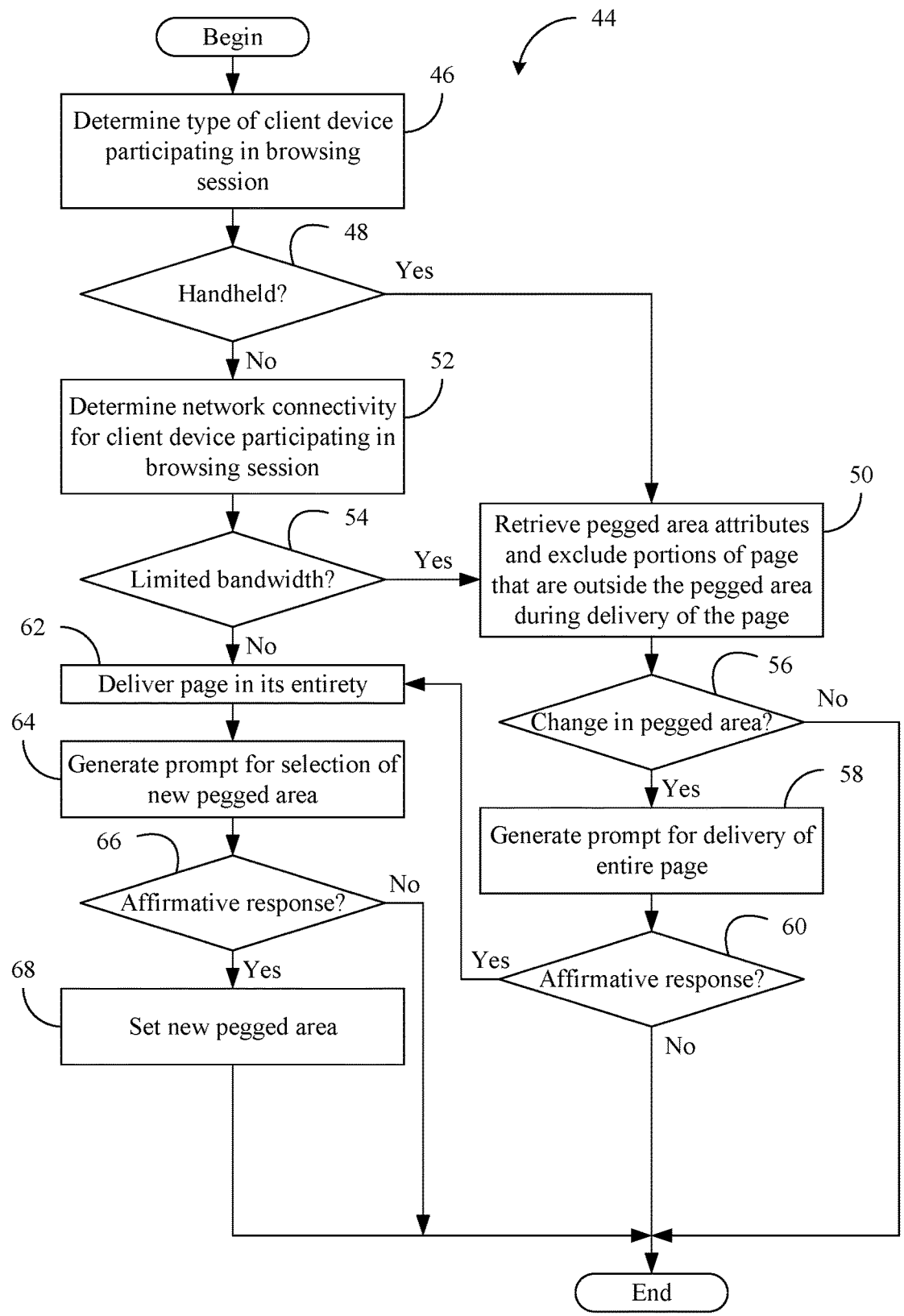
FIG. 5 is a flowchart of an example of a method of delivering a previously pegged area based on client device type and network connectivity according to an embodiment.

Turning now to FIG. 5 a more detailed method 44 is shown in which information regarding client device type and network connectivity are used to deliver previously pegged areas to client devices (e.g., during a second/subsequent browsing session). The method 44 may be implemented in computer usable code such as, for example, the computer usable code 34 (FIG. 3) or other suitable hardware module, logic, circuit, etc., to perform one or more aspects of block 42 (FIG. 4), already discussed. In the illustrated example, block 46 determines the type of client device participating in a browsing session. Block 46 may therefore involve querying the client device for information such as, operating system (OS) version, manufacturer, model, serial number, network address, media access control (MAC) address, etc., and/or extracting that information from request headers/packets, and so forth. Other approaches may also be used to determine the type of client device. If it is determined at block 48 that the client device is a handheld device (e.g., smart phone, tablet computer), illustrated block 50 retrieves pegged area attributes (e.g., predefined preferences from a user profile) for a requested page and excludes portions of the page that are outside the pegged area during a delivery of the page in question to a user interface.

If it is determined at block 48 that the client device is not a handheld device, block 52 may determine the level of network connectivity for the client device participating in the browsing session. Block 48 may therefore involve querying the client device and/or intermediate networking components for packet loss information and/or bandwidth subscription information, identifying wireless access points and/or characteristics, and so forth. Other approaches may also be used to determine network connectivity. If block 54 determines that the client device has limited networking bandwidth (e.g., packet losses exceed a certain threshold, bandwidth subscription is below a certain threshold), block 50 may retrieve pegged area attributes and exclude portions of the page that are outside the pegged area during a delivery of the page in question to a user interface, as already noted.

Illustrated block 56 determines whether content on the page corresponding to the pegged area has changed since a previous browsing session by the user. Block 56 may therefore involve comparing page content to previously stored and/or cached content on the page. If the content has changed, a prompt such as, for example, the prompt 22 (FIG. 2) may be generated at block 58 for delivery of the page in its entirety. If an affirmative response is received at block 60 (e.g., the user opts to show the entire page, remove pegging, etc.), illustrated block 62 delivers the page in its entirety to the client device for display via the UI.

In addition, if the page is delivered in its entirety (e.g., because the client device is neither a handheld device nor bandwidth limited, the pegged area has changed, the user has removed pegging, etc.), block 64 may generate a prompt for selection of a new pegged area on the page. If an affirmative response is received at block 66, illustrated block 68 sets a new pegged area based on data associated with a cursor hover action, a touch screen action, or other action on the part of the user to indicate an area of interest on the page, and the illustrated method 44 terminates. If an affirmative response is not received from the user at either block 66 or block 60, or no change in the pegged area is detected at block 56, the illustrated method 44 may terminate.

Thus, techniques described herein may peg a selected area of a screen/program (e.g., OS, web browser, mobile device, etc.) based on where a user hovers a cursor or touches a UI. Metatags for the selected area may be identified and stored as a pegged area preference for the user. Upon visiting the page/program on any of the user's devices, the pegged area may be displayed instead of the entire program/page. If the page is changed on the server (e.g., to an extent that the previously pegged area cannot be determined), the entire web page may be displayed and the user may be alerted to select a new pegged area. Accordingly, end users may be provided with increased usability of everyday content, increased customer satisfaction, and decreased load times. Moreover, productivity may be increased by obviating any need for the user to wait for page requests/queries to be completed (e.g., if the desired result is already being displayed). Additionally, accuracy may be increased by eliminating accidental selections of page objects while pages are being loaded.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:
1. A computer implemented method comprising:
receiving a set of attributes that identify a pegged area of a page delivered to a user interface during a first browsing session, wherein receiving the set of attributes includes obtaining the set of attributes from a cookie stored on a client device participating in the first browsing session;
storing the set of attributes to a profile of a user associated with the client device participating in the first browsing session;
using the set of attributes to conduct a subsequent delivery of the pegged area to a user interface during a second browsing session, wherein the subsequent delivery of the pegged area is conducted based on a type of client device participating in the second browsing session and a network connectivity available to the client device participating in the second browsing session, wherein the network connectivity is based on a measure of packet loss and bandwidth subscription information and wherein the subsequent delivery of the pegged area excludes portions of the page that are outside the pegged area if the type of client device participating in the second browsing session is a handheld device;
generating a prompt for delivery of the page in its entirety during the second browsing session, wherein the prompt for delivery of the page in its entirety is generated if content on the page corresponding to the pegged area has changed since the first browsing session; and
generating a prompt for selection of a new pegged area on the page during the second browsing session,
wherein the attributes are based on a document object model associated with content corresponding to the pegged area.

2. The method of claim 1, wherein the pegged area corresponds to a touch screen action.

3. A computer program product comprising:
a computer readable storage medium; and
computer usable code stored on the computer readable storage medium, where, if executed by a processor, the computer usable code causes a computer to:
receive a set of attributes that identify a pegged area of a page delivered to a user interface during a first browsing session, wherein to receive the set of attributes includes obtaining the set of attributes from a cookie stored on a client device participating in the first browsing session;
store the set of attributes to a profile of a user associated with the client device participating in the first browsing session;
use the set of attributes to conduct a subsequent delivery of the pegged area to a user interface during a second browsing session, wherein the subsequent delivery of the pegged area is to be conducted based on a type of client device participating in the second browsing session and a network connectivity available to the client device participating in the second browsing session, wherein the network connectivity is based on a measure of packet loss and bandwidth subscription information and wherein the subsequent delivery of the pegged area is to exclude portions of the page that are outside the pegged area if the type of client device participating in the second browsing session is a handheld device;
generate a prompt for delivery of the page in its entirety during the second browsing session, wherein the prompt for delivery of the page in its entirety is generated if content on the page corresponding to the pegged area has changed since the first browsing session; and generate a prompt for selection of a new pegged area on the page during the second browsing session, wherein the attributes are based on a document object model associated with content corresponding to the pegged area.

4. The computer program product of claim 3, wherein the pegged area is to correspond to a touch screen action.

5. The computer program product of claim 3, wherein the pegged area is to correspond to a cursor hover action.

6. A system comprising:
a processor;
a computer readable storage medium; and
computer usable code stored on the computer readable storage medium, where, if executed by the processor, the computer usable code causes a computer to:

receive a set of attributes that identify a pegged area of a page delivered to a user interface during a first browsing session, wherein to receive the set of attributes includes obtaining the set of attributes from a cookie stored on a client device participating in the first browsing session;

store the set of attributes to a profile of a user associated with the client device participating in the first browsing session;

use the set of attributes to conduct a subsequent delivery of the pegged area to a user interface during a second browsing session, wherein the subsequent delivery of the pegged area is conducted based on a type of client device participating in the second browsing session and a network connectivity available to the client device participating in the second browsing session, wherein the network connectivity is based on a measure of packet loss and bandwidth subscription information and wherein the subsequent delivery of the pegged area is to exclude portions of the page that are outside the pegged area;

generate a prompt for delivery of the page in its entirety during the second browsing session, wherein the prompt for delivery of the page in its entirety is to be generated if content on the page corresponding to the pegged area has changed since the first browsing session; and generate a prompt for selection of a new pegged area on the page during the second browsing session, wherein the attributes are based on a document object model associated with content corresponding to the pegged area.

7. The system of claim 6, wherein to receive the set of attributes includes obtaining the set of attributes from a cookie stored on a client device participating in the first browsing session.

8. The system of claim 6, wherein the subsequent delivery of the pegged area is to exclude portions of the page that are outside the pegged area if the type of client device participating in the second browsing session is a handheld device.

9. The system of claim 6, wherein the attributes are based on metadata associated with the pegged area.

10. The system of claim 6, wherein the pegged area is selected by the user.

11. The system of claim 6, wherein the pegged area is to correspond to a cursor hover action.

12. The system of claim 6, wherein the pegged area is to correspond to a touch screen action.

* * * * *